(12) United States Patent
Vitale et al.

(10) Patent No.: US 7,161,563 B2
(45) Date of Patent: Jan. 9, 2007

(54) ELECTRONIC VEHICLE REGISTRATION AND LICENSE PLATE

(75) Inventors: Robert Louis Vitale, Macomb Township, MI (US); Kevin G. Kolpasky, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 708 days.

(21) Appl. No.: 10/023,373

(22) Filed: Dec. 17, 2001

(65) Prior Publication Data

US 2003/0112242 A1 Jun. 19, 2003

(51) Int. Cl.
*G09G 3/18* (2006.01)

(52) U.S. Cl. .............................. 345/38; 345/37; 345/39; 345/467; 345/470; 715/745; 715/748; 715/749; 715/750; 340/425.5; 340/426.1; 340/426.19; 701/32

(58) Field of Classification Search ................ 345/440, 345/467, 38, 39, 470, 37; 382/105; 715/745, 715/748, 749, 750
See application file for complete search history.

(56) References Cited

U.S. PATENT DOCUMENTS

| 5,105,179 A | * | 4/1992 | Smith .......................... 340/468 |
| 5,396,233 A | * | 3/1995 | Hofmann ..................... 340/933 |
| 6,052,068 A | * | 4/2000 | Price R-W et al. ......... 340/933 |
| 6,636,145 B1 | * | 10/2003 | Murakami et al. ........... 340/5.9 |
| 2002/0195490 A1 | * | 12/2002 | Gehlot et al. ............... 235/384 |
| 2003/0065630 A1 | * | 4/2003 | Brown et al. ............... 705/413 |

* cited by examiner

*Primary Examiner*—Kee M. Tung
*Assistant Examiner*—Tam Tran
(74) *Attorney, Agent, or Firm*—Christopher DeVries

(57) ABSTRACT

A method and apparatus is provided for electronically providing vehicle identification and registration information to a vehicle. The system includes a remote control unit, which receives and stores vehicle identification and registration information. At least one computer on the vehicle is configured to receive the vehicle identification and registration information and to store such information. An electric license plate coupled to this computer for electronically displaying at least a portion of the identification and registration information stored in the computer.

20 Claims, 2 Drawing Sheets

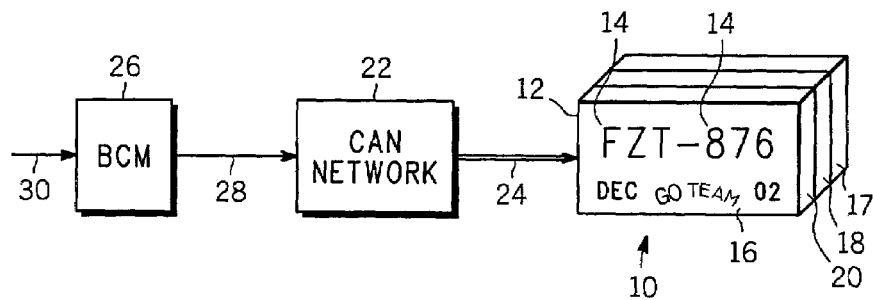
FIG. 1
FIG. 2
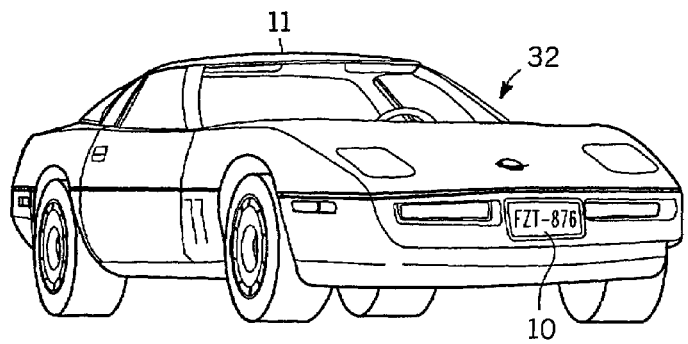
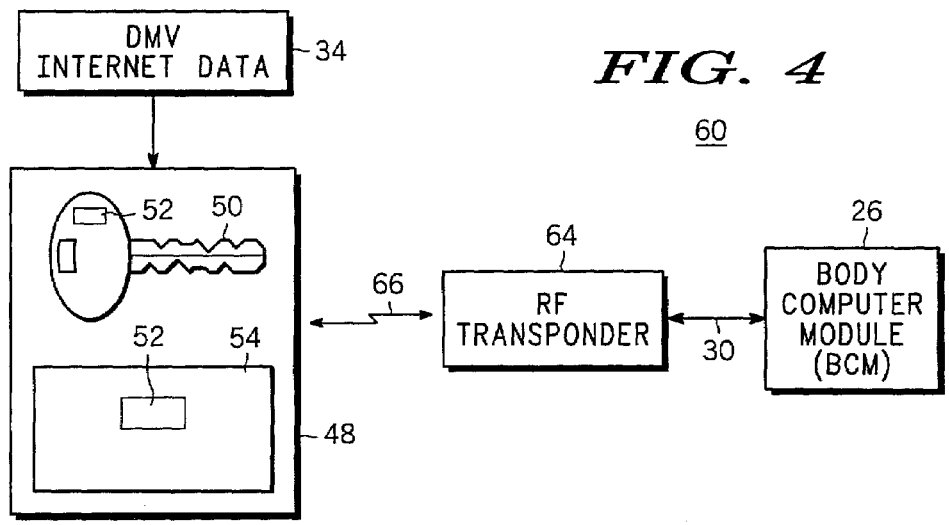
FIG. 4

ELECTRONIC VEHICLE REGISTRATION AND LICENSE PLATE

TECHNICAL FIELD

This invention relates generally to a vehicle registration communication system and to a method of operation thereof and, more particularly, to an electronic vehicle identification and registration system capable of receiving and storing information from an authorizing agency identifying a specific vehicle.

BACKGROUND OF THE INVENTION

In recent years, the number of vehicles on the road has dramatically increased. Today, record management such as vehicle registrations is provided by administrative agencies that are sometimes poorly equipped to handle the ever-increasing workload. For example, the employees of the Department of Motor Vehicles (DMV) are burdened with the responsibilities of renewing registrations, conducting vehicle inspections, issuing driver's licenses for hundreds of vehicles and drivers each day, and collecting fees for each of these services. That this approach is inefficient is evident by the long lines of customers at local DMV offices. Furthermore, contracting some of these administrative tasks out to local independent service centers has not been entirely successful.

In addition to the many other services provided by local DMV offices, they are also responsible for the issuance of license plates that are secured to a vehicle and display data that signifies that the vehicle is properly registered with an appropriate government agency. Historically, license plates are of a simple metallic structure that is stamped to display alphanumeric information. They suffer, however, several disadvantages. For example, registration renewals are costly, and since the renewal status is reflected on the license plate, the license plate is a target for thieves. Additionally, traditional license plates often times clash with the esthetics of modern car styling and colors. Since they are generally attached to the rear and/or front bumpers of the vehicle, constraints are placed on the automotive designers who must incorporate fascias into the bumper designs to receive the license plates.

In view of the foregoing, it should be appreciated that it would be desirable to provide a method and apparatus for automatically providing registration and license plate information to a vehicle. Additional desirable features will become apparent to one skilled in the art from the foregoing background of the invention and the following detailed description of a preferred exemplary embodiment and the appended claims.

SUMMARY OF THE INVENTION

In accordance with the teachings of the present invention, a method and apparatus is provided for identifying and registering a vehicle. A remote control unit receives and stores vehicle identification and registration information. At least one computer on the vehicle receives the identification and registration information from the remote control unit and stores the information therein. An electronic license plate is coupled to the computer for electronically displaying at least a portion of the identification and registration information stored in the computer.

BRIEF DESCRIPTION OF THE DRAWINGS

The present invention will hereinafter be described in conjunction with the appended drawings, wherein like numerals denote like elements, and wherein:

FIG. 1 is a block diagram of that portion of the inventive electronic vehicle identification and registration system that shows how a digital license plate receives registration information from a vehicular onboard computer;

FIG. 2 is a graphical representation of an automobile equipped with the inventive digital license plate;

FIG. 4 is a block diagram illustrating the interface between the onboard computer and the remote control unit described in connection with FIG. 3.

DESCRIPTION OF THE PREFERRED EMBODIMENT

Figure 3:
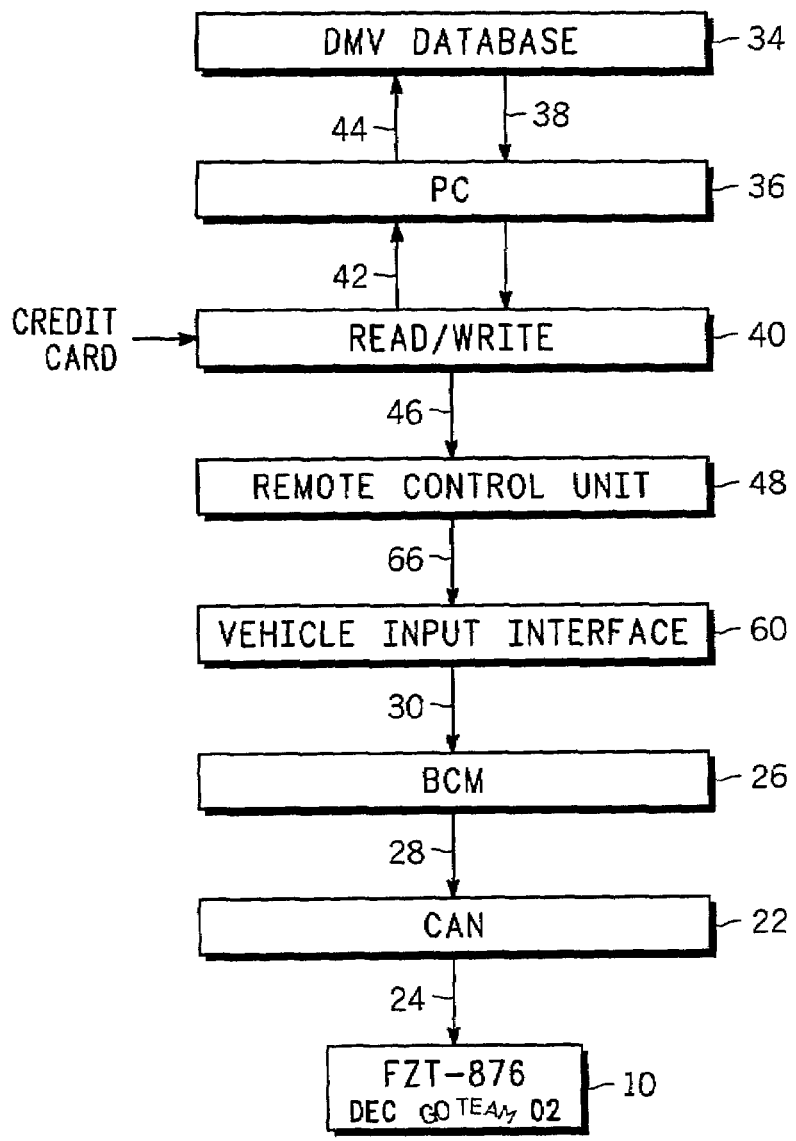
FIG. 3 is a block diagram which illustrates the structure and operation of the inventive electronic vehicle identification and registration system.

The following description of a preferred embodiment of the invention is mainly exemplary in nature and is not intended to limit the invention, the application, or the use of the invention.

As stated previously, a license plate is traditionally a metal plate that is secured to a vehicle and stamped with alpha numeric information that identifies the vehicle and signifies that the vehicle is properly registered with an appropriate government agency (e.g., the Department of Motor Vehicles (DMV)) or the Secretary of State. These stamped metal plates often clash with the vehicle's styling and color and place design constraints on the automotive designers who must design the fascias in the vehicle's bumpers for receiving the plates.

FIG. 1 and FIG. 2 illustrate a digital license plate system for an electronic vehicular identification and registration system. Digital license plate, shown generally at 10, is a molded digital display 12 that is adaptable to rear and/or front bumper fascias (shown front mounted in FIG. 2); i.e., there is no alteration to the fascias themselves. Display 12 preferably comprises a light emitting diode (LED)/liquid crystal display (LCD) system which enables the formation of alpha numeric characters 14 indicative of vehicle number and expiration date, state identification, or other logos (GO MSU) shown on the face 16 of display 12.

Digital plate 10 comprises an LED backpanel 17 which provides backpanel illumination, an intermediate LCD display panel 18 for displaying digital data, and a clear front panel 20 which serves as a protection panel and could, if desired, contain a heating grid for use in cold climates to melt ice, snow, etc. Backpanel 17 has provided thereon an LED background that is made of, for example, polymeric or organic non-pixilated LEDs. Intermediate panel 18 is a flexible polymeric LCD display for converting the information signal to a digital display. Front panel 20 may actually be constructed as a part of the fascia surface and translucent to the vehicle's body paint color so as to create an esthetically pleasing appearance.

Digital plate 10 is coupled to receive information signals from CAN (Controlled Area Network) 22, which includes the required interface, drivers and a dedicated processor for converting incoming information signals to digital display signals. CAN 22 may be coupled to digital plate 10 by, for example, a flat cable 24, which delivers both power and intelligence to digital plate 10. A small connector (not shown) may be designed into each bumper fascia, either as an after-market system or built into the fascia as an OEM system. Digital display 10 will be designed to be extremely thin and may, for example, be secured in slots provided in the fascia.

It is well known that modern vehicles are equipped with multiple onboard computers which control different aspects of a vehicle's operation, (e.g., power train and engine control). A body computer module (BCM) 26 is typically responsible for controlling functions such as information clusters on the vehicle's instrument panel, heating and air conditioning, etc. BCM 26 receives and stores the license plate information supplied over link 30 in a manner that will be described in more detail below and provides this information to CAN 22 over link 28 by means of, for example, a copper harness or fiber optic cable. Since BCM 26 is factory installed when the vehicle is being manufactured, BCM 26 could easily be programmed to contain the vehicle identification number (VIN) as well as other printed data including but not limited to reference numbers for the specific parts used on the vehicle, etc. When the vehicle is delivered to a customer, additional DMV data, (e.g., plate number, registration data, etc.) specific to that vehicle may be downloaded and stored in BCM 26 as will also be described below. The customer can then annually automatically update this data.

The digital license plate 10 described above would be visible even in extreme conditions; for example, its electric luminescent characteristic would make it visible even in intense sunlight. LED luminosity is rated in "NITS", an acronym used by the panel industry for automotive applications where issues of sunlight and glare play an important role in the readability of the display. For automotive uses, a value of approximately 1000 NITS is considered acceptable for high visibility. In snowy conditions, the heat generated by the digital display maintains visual acuity intact. Furthermore, the digital license plate 10 would be turned on (i.e., the display activated) only when the vehicle is operating. When the vehicle is turned off, license plate 10 is likewise turned off. If it became necessary to identify a vehicle that was not operating (i.e., engine off), a law enforcement official could easily read the VIN number which is attached to the body of the vehicle 11 and visible through the windshield shown at 32 in FIG. 2. If bar-coded, this could be accomplished through the use of a handheld scanner. The VIN is all that is required to obtain the vehicle registration information that is stored at the DMV's database.

As stated above, the existing vehicle registration system is a paper intense system requiring large dedicated staffs of DMV employees. In addition, paper registrations are required to be kept in the vehicle or on the person of the driver at all times. Thus, they can be easily lost, damaged, or confused with other documents. The present invention avoids these disadvantages by providing a system and procedure for encoding vehicle identification and registration information onto a smart chip built into a remote control unit normally utilized to lock/unlock the vehicle doors, trunk, ignition, etc. In some cases, this remote control unit, commonly referred to as an FOB, is an integral part of the ignition key. The invention also contemplates encoding the identification and registration information including the VIN into a smart card and onto the VIN plate, each of which would include a smart chip into which the vehicle identification and registration and other relevant information could be stored. Storing the information in the VIN plate would permit access to the information when the vehicle is turned off.

Referring to FIG. 3, registration information from the authorizing agency's (e.g., DMV) database 34 is downloaded over the Internet, for example, to a customer's personal computer (PC) 36 via link 38. If this is occurring at the time of initial sale of the vehicle, PC 36 could be located at the car dealership. If a yearly renewal is taking place, PC 36 could be any personal computer accessible to the customer. Further, if the transaction involves a yearly renewal requiring a fee, the fee could be paid electronically by providing the customer's credit card information back to the DMV by means of read/write unit 40 and PC 36 over links 42 and 44, again perhaps over the Internet.

Registration, vehicle identification and other relevant information are then communicated via link 46 to remote control unit 48 via read/write unit 40. Remote control unit 48 may be a key FOB 50 or a smart card 54 each containing a smart chip 52 (see FIG. 4). Smart chip 52 contains a non-volatile memory that stores the registration, identification, and other information provides by read/write unit 40. Key FOB 50 and/or smart card 54 are each powered by a small battery that in the case of a key FOB may be charged by inserting the key into the ignition.

The description thus far describes how remote control unit 48 receives new data via the Internet from the DMV database 34. It should be clear that alternatively, a customer could bring remote control unit 48 to a local DMV for programming. The interrelationship between remote control unit 48, vehicle input interface 60, and body computer module 62 is best described by additionally referring to FIG. 4. Vehicle input interface 60 includes a transponder 64 housed within vehicle 11. Transponder 64 interrogates a transponder in smart chip 52 as is shown by RF link 66. Smart chip 52 responds to this interrogation. If the registration is a new one, smart chip 52 informs transponder 64 of that fact, and transponder 64 transmits the new data to BCM 26 via link 30 for storage therein. BCM 26 then provides the updated data to digital license plate 10 via CAN 22 as was described earlier in connection with FIG. 1 and as is shown in FIG. 3. If, on the other hand, the registration data in smart chip 52 is not new and the driver is merely attempting to enter and start the vehicle, BCM 26 compares the registration and identification data being supplied by smart chip 52 via transponder 64 and link 30 with that already stored in BCM 26. In this way, remote control unit 48 is validated, and the vehicle and the ignition are unlocked.

The inventive vehicle identification and registration system offers several distinct advantages. The process is electronic and handled through digital media. Its substantially eliminates the need for a paper registration process and fosters accuracy and efficiency. State government would benefit greatly due to the elimination of the necessity to service customers periodically at DMV offices, generate and mail paper documentation, and produce and mail metal license plates. This greatly reduces overhead and streamlines the entire process.

From the foregoing description, it should be appreciated that a method and apparatus for electronically providing vehicular registration and identification information has been provided. While the preferred exemplary embodiment has been presented in the foregoing detailed description, it should be appreciated that a vast number of variations in the embodiments exist. It should also be appreciated that this preferred exemplary embodiment is only an example and is not intended to limit the scope, applicability, and configuration of the invention in any way. Rather, the foregoing detailed description provides those skilled in the art with a convenient road map for implementing a preferred embodiment of the invention. It should be clear that various changes in form and detail might be made by one skilled in the art without departing from the spirit and scope of the invention as set forth in the appended claims.

The invention claimed is:

1. A method for identifying and registering a vehicle, comprising:
   receiving and storing vehicle identification and registration information pertaining to the vehicle in a remote control unit;
   comparing the information stored in the remote control unit with data stored in the vehicle; and
   displaying at least a portion of the vehicle identification and registration information on an electronic license plate.

2. A method according the claim 1 wherein said receiving includes downloading vehicle identification and registration information from an authorizing agency's database to a customer's personal computer.

3. A method according the claim 2 wherein said downloading includes transmitting the vehicle identification and registration information to the personal computer over the Internet.

4. A method according the claim 3 further including transmitting credit card information to the authorizing agency to pay a fee associated with receiving the vehicle identification and registration information.

5. A method according the claim 1 wherein said comparing includes transmitting the vehicle identification and registration information to the vehicle to replace the data stored in the vehicle if the vehicle identification and registration information is new.

6. A method according the claim 1 wherein said comparing includes unlocking at least one door in the vehicle if the vehicle identification and registration information matches the data stored in the vehicle.

7. A method according the claim 6 wherein said comparing includes unlocking an ignition system of the vehicle if the vehicle identification and registration information matches the data stored in the vehicle.

8. A method according the claim 5 further comprising updating the portion of the vehicle identification and registration information being displayed on the electronic license plate if the vehicle identification and registration information is new.

9. A system for storing identification and registration information on a vehicle, the system comprising:
   a remote control unit for receiving and storing identification and registration information pertaining to said vehicle;
   at least one computer on said vehicle for receiving the identification and registration information from said remote control unit and for storing the identification and registration information; and
   an electronic license plate coupled to said computer for displaying at least a portion of the identification and registration information.

10. A system according to claim 9 wherein said remote control unit is a FOB.

11. A system according to claim 9 wherein said remote control unit is a smart card.

12. A system according to claim 9 further comprising an interface unit on the vehicle for communicating with said remote control unit.

13. A system according to claim 12 wherein said interface unit communicates with said remote control unit over wireless link.

14. A system according to claim 13 wherein said interface unit is a transponder.

15. A system according to claim 9 wherein said at least one computer includes a comparator for comparing vehicle identification and registration information being received from said remote control unit with that stored in said at least one computer for updating said at least one computer if the vehicle identification and registration information is new.

16. A system according to claim 10 further comprising a smart chip in said FOB.

17. A system according to claim 16 wherein said FOB is a keyfob.

18. A system according to claim 11 further comprising a smart chip in said smart card.

19. A system according to claim 9 wherein said electronic license plate comprises:
   a light emitting diode back panel; and
   a liquid crystal display front panel.

20. An identification and registration information system for use on a vehicle, comprising:
   a key FOB for receiving, storing, and transmitting identification and registration information pertaining to the vehicle;
   at least one computer deployed on the vehicle for wirelessly receiving and storing information transmitted from said keyfob; and
   an electronic license plate mounted on the vehicle and coupled to said computer, said license plate for displaying at least a portion of the information stored in said computer.

* * * * *